(12) United States Patent
Naji et al.

(10) Patent No.: US 8,153,245 B2
(45) Date of Patent: *Apr. 10, 2012

(54) COMPOSITE PRODUCT

(75) Inventors: Basil Naji, Upland, CA (US); John Sydney Cottier, Oatley (AU); Robert Lyons, Ladera Ranch, CA (US)

(73) Assignee: James Hardie Technology Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/691,505

(22) Filed: Jan. 21, 2010

(65) Prior Publication Data

US 2010/0124860 A1    May 20, 2010

Related U.S. Application Data

(63) Continuation of application No. 11/634,285, filed on Dec. 4, 2006, now abandoned, and a continuation of application No. 11/128,778, filed on May 13, 2005, now abandoned, and a continuation of application No. 10/090,406, filed on Mar. 4, 2002, now Pat. No. 6,893,751.

(30) Foreign Application Priority Data

| Mar. 2, 2001 | (AU) | PR3474 |
|---|---|---|
| Mar. 2, 2001 | (AU) | PR3475 |
| Mar. 2, 2001 | (AU) | PR3476 |
| Mar. 2, 2001 | (AU) | PR3477 |
| Mar. 2, 2001 | (AU) | PR3478 |

(51) Int. Cl.
*B32B 9/00* (2006.01)
*C04B 37/00* (2006.01)

(52) U.S. Cl. ............... 428/312.4; 428/317.9; 428/703; 156/325

(58) Field of Classification Search ............... None
See application file for complete search history.

(56) References Cited

U.S. PATENT DOCUMENTS

| 3,592,724 A | * | 7/1971 | King, Jr. | 428/340 |
|---|---|---|---|---|
| 3,949,144 A | * | 4/1976 | Duff | 428/414 |

* cited by examiner

*Primary Examiner* — Timothy Speer
(74) *Attorney, Agent, or Firm* — Knobbe, Martens, Olson & Bear, LLP

(57) ABSTRACT

An exemplary composite product and method of manufacturing is provided. In one embodiment, the method includes dewatering a first slurry through a dewatering belt to form a first substrate layer, applying a first functional layer onto at least a portion of the first substrate layer, and dewatering a second slurry through the dewatering belt to form a second substrate layer. A first side of the second substrate layer may be overlayed onto the first functional layer, and the layers may be cured, and the layers bonded.

20 Claims, No Drawings

COMPOSITE PRODUCT

BACKGROUND OF THE INVENTION

Pursuant to 35 U.S.C. §120, this continuation application claims priority from, and hereby incorporates by reference for all purposes, copending U.S. patent application Ser. No. 11/128,778 entitled Composite Product, naming Basil Naji, John Sydney Cottier, and Robert Lyons as inventors, filed May 13, 2005, which pursuant to 35 U.S.C. §120 claims the benefit of U.S. patent application Ser. No. 10/090,406 (Issued U.S. Pat. No. 6,893,751, issued May 17, 2005) entitled Composite Product, naming Basil Naji, John Sydney Cottier, and Robert Lyons as inventors, filed Mar. 4, 2002, which claims priority from the following Australian provisional patent applications, the full contents of which are hereby incorporated by reference for all purposes:

| App. No. | Title | Date Filed |
| --- | --- | --- |
| PR3474 | A Composite Product | 2 Mar. 2001 |
| PR3475 | Spattering Apparatus | 2 Mar. 2001 |
| PR3476 | Additive for a Dewaterable Slurry | 2 Mar. 2001 |
| PR3477 | A Method and Apparatus for Forming a Laminated Sheet Material by Spattering | 2 Mar. 2001 |
| PR3478 | Coatings for Building Products | 2 Mar. 2001 |

FIELD OF THE INVENTION

The present invention relates to composites and particularly, but not limited to, fibre reinforced building composites.

DESCRIPTION OF THE RELATED ART

Any discussion of the prior art throughout the specification should in no way be considered as an admission that such prior art is widely known or forms part of common general knowledge in the field.

Fibre reinforced cement (FRC) is an extremely popular building product.

The applicant along with other various parties have developed a variety of techniques for producing fibre reinforced cement building products and tailoring those FRC products to the particular environment of use.

There are still, however, certain limitations with regard to FRC products. They have limited acoustic, thermal and fire retardant properties. They can exhibit limited workability and generally lie in the medium density range (around 1300 kg/m$^3$) or higher (compressed densities of around 1700 kg/m$^3$).

Generally, the properties of fibre cement are altered by addition of other materials eg different fibres, fillers etc or altered with different production techniques. Such alterations to the FRC formulation, however, can be expensive to develop in order to ensure no detrimental side effects arise from such new formulations. Alterations in production methods or equipment are also expensive and time consuming to develop. Such techniques also do not provide for true "tailoring" of the FRC product. It is, of course, inappropriate to shut down an entire production line, for example, to produce a small batch of FRC product tailored to a specific use.

It is an object of the present invention to overcome or ameliorate at least one of the disadvantages of the prior art, or to provide a useful alternative.

SUMMARY OF THE INVENTION

In a broad aspect, the present invention provides a composite product comprising a substrate layer and one or more functional layers applied thereto, each functional layer including a mixture of hydraulic binder, dewatering agent wherein the quantity of dewatering agent is sufficient to permit de-watering of each functional layer through the substrate layer and any additional functional layer.

In a second aspect, the present invention provides a method of manufacturing a composite product comprising:
 (i) providing a substrate layer,
 (ii) providing a slurry formulation including an hydraulic binder and dewatering agent,
 (iii) applying said slurry to said substrate layer to form a functional layer,
 (iv) dewatering the functional layer, and
 (v) optionally repeating steps (ii) through (iv), wherein the quantity of dewatering agent is sufficient to maintain porosity and thereby permit de-watering of each functional layer through the substrate layer and any additional functional layer.

Preferably, the substrate layer is a fibre reinforced base material such as fibre reinforced cement. This substrate layer provides a structural base on which additional functional layers may be added.

The functional layers may be added to both sides of the substrate layer but most preferably are added to one side which generally expose one side of the building board during production. Such a technique allows the aforementioned method to be applied to current FRC production techniques such as Hatschek.

DETAILED DESCRIPTION OF THE PREFERRED EMBODIMENTS

The present applicants have developed a process for manufacture of a composite article to virtually any desired specification or use. To explain, the present inventive composite and method starts with a simple water permeable substrate layer such as conventional fibre reinforced building board. To this base layer are added one or more functional layers, each functional layer being specifically tailored to provide the desired functionality. For example, if it is desired to provide an insulating layer, the slurry formulation from which the functional layer is formed can include insulating materials such as rubber crumbs, vermiculite, perlite, gypsum, etc.

Similarly, water permeability may be decreased by including water resistant polymers eg silanes, siloxane blends etc or pozzalanic materials such as silica fume, metakaoline, ultrafine fly ash etc.

Density modification of the functional layer can be accomplished by addition of suitable light weight materials such as cenospheres (ceramic hollow spheres), expanded polystyrene, vermiculite, perlite etc.

The inventive process enables various functional layers to be integrated into a single composite by appropriate slurry modification.

In a preferred embodiment, each functional layer has a reinforcing layer positioned therebetween. The reinforcing layer may comprise fibre mesh or netting, and serves to improve the strength and durability of the composite product.

In some instances, the reinforcing layer may comprise a thin fibre reinforced cementitious layer similar for instance to the base material. This provides for more efficient utilisation of such fibre reinforced layers, similar to sandwich composite technology. It will be appreciated by a person skilled in the art, that there are areas of a composite which require less fibre reinforcement ie the core. Such a core area can be formed as the aforementioned functional layer with low fibre reinforcement. Areas which require high fibre reinforcement due to high tensile strength ie surface or skin areas, can be covered by a fibre reinforced cementitious layer. The thus formed fibre reinforced layers act as sandwich skins with a de-watered slurry functional layer acting as a sandwich core.

As a result, the described composite provides significant advantages over monolithic fibre reinforced composites. Firstly, by the aforementioned composite action, fibres can be positioned in areas where they are most required. This will, of course, lead to a reduction in the fibre reinforced volume of the product.

Secondly, such a reduced fibre volume will lead to an improvement in non-combustibility and thermal insulation performance of the composite. Production of a non-combustible composite has, in the past, been difficult to achieve due the high cost of non-combustible fibres and specialised processes required for their use.

Further, one of the most important advantages arising from preferred embodiments of the present invention is the ability to concentrate a particular functionality into a single layer. To explain, in large monolithic structural layers, particularly fibre reinforced cement building products, any adjustments to the functional or structural aspects of the product, to be diluted or diminished or unevenly spread throughout the product. There is also the possibility of adverse side reactions occurring during production of such a monolithic product which may diminish the structural or functional attributes required. With the present invention, on the other hand, it is possible to concentrate or target specific functional or structural attributes within a single functional layer thereby assuring the attribute is provided to the resultant composite product.

Indeed, various optional additives and filler can be incorporated for specific purposes, ie acoustic, thermal or fire performance, density modification, cost or production efficiency.

A top or finish coating layer can also be provided for the composite product by a fibre reinforced cementitious layer, a material similar or identical to the functional layer or any other product. In one particularly preferred embodiment, the top or finishing coating can be primarily an "aesthetic" layer of, say, ultrafine particle size or made from a sandable material to smooth the exterior surface of the composite product and thereby provide a finish/paint ready surface.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

The dewatering agent serves to maintain sufficient porosity in the slurry and product to be coated to permit dewatering of the slurry through the product to be coated. Preferably, the dewatering agent is a particulate material such as fly ash, alumina trihydrate, silica flour, cenospheres (ceramic hollow spheres) or similar.

Fly ash is particularly preferred as it permits dewatering of the slurry within a few minutes. Other particulate dewatering agents such as alumina trihydrate or silica flour may also be used, however, they increase the time required for dewatering of the slurry through the product to be coated.

In a preferred embodiment, the slurry applied to the product to be coated has a high water content. Preferably, the water content can be up to about 50%. This is in contrast to previous cementitious formulations which generally have a very high solids content.

By combining the various components of the formulation described above, a self levelling dewaterable slurry is obtained which can be applied to the substrate layer, dewatered through the substrate layer and thereby provide a uniform coating over this substrate layer.

Normally, after application of the coating, the resultant product would be normally cured, steam cured or hydrothermally cured, ie autoclaved, and if required, sanded to a smooth flat finish.

The substrate layer to which the functional layers can be applied is virtually limitless provided the slurry can be dewatered through the substrate layer. Cementitious and gypsum building boards are typical examples of suitable building products on which the coating can be applied.

The thickness of the functional layers would range from around 0.1 to 10 mm, preferably about 0.5 to 5 mm and most preferably about 1 to 3 mm.

After optional sanding, the layer may have a depth of around 0.05 to 5 mm, preferably about 1 to 2 mm and most preferably about 0.5 to 1 mm. The thus produced composite is comparable in its workability to monolithic (single layer) composites. It can be flexed, cut, drilled and fixed by nails etc to a frame without surface cracking or chipping.

The applicants have found an extremely good interlaminer bond and compatibility between the dewatered slurry layer and base layer resulting in excellent composite action, compatibility and resistance to delamination.

The term 'hydraulic binder' as used throughout the specification refers to a pulverised material in the solid, dry state which, when mixed with water, yields plastic mixtures that are able to set and harden, for example a cement. Included within the definition are white, grey or pigmented cements and hydraulic limes.

The term 'cement' includes hydraulic and alite cements such as portland cement, blended cements such as portland cement blended with fly ash, blast-furnace slag, pozzalans and the like and mixtures thereof, masonry cement, oil well cement, natural cement, alumina cement, expansive cements and the like, or mixtures thereof.

The quantity of binder in the formulation is preferably between about 10 to 50 wt % based on the total dry ingredients, more preferably about 15 to 40 wt % and most preferably about 20 to 30 wt %.

The fly ash used in the preferred embodiments provides a number of advantages including, particularly, as an aid to dewatering of the slurry as defined above.

The term 'fly ash' as used herein refers to a solid powder having a chemical composition similar to or the same as the composition of material that is produced during combustion of powdered coal, ie about 25 to 60 wt % silica, about 10 to 30 wt % $Al_2O_3$, about 5 to 25 wt % $Fe_2O_3$, about 0 to 20 wt % CaO and about 0 to 5 wt % MgO.

In another preferred embodiment, the dewatering agent may include a coarse fraction fly ash which is greater than about 100 microns. This coarse fraction fly ash includes bottom ash or similar products from coal combustion. There is an advantage to using these products over the aforementioned particle size fly ash since it is cheaper. Of course, as will be clear to persons skilled in the art, some reformulation of the slurry may be required to provide a suitable coating and appropriate dewatering characteristics when the dewatering agent is such a coarse fraction fly ash.

Fly ash particles are typically spherical and range in diameter from about 1 to 100 microns. In a preferred embodiment, the fly ash comprises two components. A first 'larger' size particles of fly ash with preferably about a 100 micron maximum size. This size range of fly ash is used in the slurry to aid in improving the dewatering characteristics of the slurry but also as a moderately reactive pozzalan.

The second 'smaller' fly ash size zone which preferably has about a 10 micron maximum size also adds an improving dewatering characteristic but is a more highly reactive pozzalan. This 'smaller' fly ash particle zone also improves the sanded surface quality of the finish layer.

In a preferred embodiment, the first fly ash comprises about 10 to 60 wt % of the formulation based on total dry ingredients, more preferably about 20 to 50 wt % and most preferably about 30 to 40 wt %.

The second fly ash component preferably provides about 5 to 30 wt % of the formulation based on total dry ingredients, more preferably about 10 to 25 wt % and most preferably about 15 to 20%.

The functional layers may optionally contain other additives such as fillers. Such fillers may also be used to improve the dewatering characteristics of the slurry. For example, cenospheres (hollow ceramic microspheres) diatomite, wollastonite, ground rice hulls, ground perlite or the like, are particularly suitable for this purpose.

These and other fillers may also be used to provide additional benefits, for example calcium carbonates or alumina hydrates improve sandability and flexibility of the coated layer respectively. Silica flour improves hardness of the sanded surface of the coating layer and the acoustic/thermal insulation properties of the layer can be improved by including rubber particles, vermiculite, perlite, shredded or expanded polystyrene or gypsum.

The fillers preferably comprise about 5 to 30 wt % of the formulation based on total dry ingredients, more preferably about 10 to 25 wt % and most preferably about 25 to 20 wt %.

The functional layers may also contain other organic additives. Cement plasticising agents, for example, may be used to alter the rheology of the slurry. Suitable cement plasticising agents include melamine sulphonate formaldehyde condensates, naphthalene sulphonate formaldehyde condensates, naphthalene sulphonates, calcium lignosulphonates, sodium lignosulphonates, saccharose, sodium gluconate, sulphonic acids, carbohydrates, amino carboxylic acids, polyhydroxycarboxilic acids, sulphonated melomine and the like.

The amount of cement plasticiser of course will depend upon the fluidising ability of the particular plasticisers. Generally the quantity of plasticiser will be in the range of about 0.3 to 3 wt % and more preferably about 0.5 to 2 wt % based on the total of dry ingredients in the formulation.

Particularly preferred cement plasticisers are Melment F-10, a melamine formaldehyde sodium bisulphate polymer dispersant marketed by SKW-Trostburg in the form of a fine white powder. Another suitable plasticiser is Neosyn, a condensed sodium salt of sulphonated naphthalene formaldehyde available from Hodgson Chemicals.

Another preferred component in the coating is a biopolymer which acts to enhance the flowability, segregation resistance and self levelling qualities of the cementitious slurry. Particularly suitable biopolymers are xanathan gum and/or whelan gum, eg KELCO-CRETE, K1C 376 manufactured by Monsanto.

Latex may also be included in the formulation to improve adherence, elasticity, stability and impermeability of the functional layers. The latex also improves flexibility of the formed composite.

The latex may be selected from the group consisting of acrylic latex, styrene latex, butadiene latex or mixtures thereof and is provided preferably in an amount between about 0.5 to 20%, more preferably about 1 to 15% and most preferably about 10% by weight of cement (on polymer solids basis) solids.

Vinyl polymers may also be incorporated into the formulation either in addition or as a substitute to the latex emulsions. Such vinyl polymers or equivalent polymeric materials enhance adhesion, resilience and flexural strength and abrasion resistance of the functional layer.

Preferred vinyl polymers include polyvinyl acetate or a copolymer vinyl acetate with another monomer such as ethylene. A particularly preferred vinyl acetate resin is VINNAPAS LL5044 thermo plastic resin powder which contains a vinyl acetate-ethylene copolymer available from Wacker. Such powdered vinyl polymer is preferably provided in quantities similar to the latex emulsion referred to above.

In addition to the above, conventional other additives such as mineral oxides, hydroxides and clays, metal oxides and hydroxides, fire retardants such as magnesite, thickeners, silica fume or amorphous silica, water sealing agents, water reducing agents, setting modifiers, hardeners, dispersants, foaming agents or flocculating agents, water-proofing agents and density modifiers are suitable for use with the present invention.

In this regard, one particular advantage arising from the preferred embodiments is the ability to treat the product to be coated by providing additives in the functional layer. To explain, since the slurry is dewatered through the product to be coated, it is possible to provide additives to the base layer by incorporation in the slurry. For instance, a waterproofing agent such as silane may be included in the formulation in excess of the functional layer requirements. During dewatering, the silane will be drawn into and through the base layer being coated thereby treating the base layer. This simultaneous treatment of the base layer as well as providing a functional attribute via the deposited layer is a valuable additional benefit arising from the aforedescribed method.

EXAMPLES

The present invention will now be described by way of example only with reference to the following embodiments.

In each of the following examples, the product was produced as follows.

Step 1 Slurry Preparation

A slurry of the formulation is prepared by mixing the hydraulic binder, fly ash and other optional components with water. The solids content in the slurry is preferably between about 50 and 90%, more preferably about 55 to 80% and most preferably about 60 to 70%.

Step 2 Slurry Application/Dewatering

The slurry is applied to the base layer by any convenient means such as brushes rollers, knives or sprays etc. The slurry is designed to self level and form a uniform coating on the product. The building product to be coated exhibits a certain degree of porosity causing the slurry to dewater and form a uniform deposited cementitious layer. Time for dewatering can vary quite dramatically but normally occurs between about 10 and 90 seconds, depending on the porosity of the material to be coated, its water content and thickness and viscosity of the slurry formulation. A vacuum may be used to reduce the slurry dewatering time if required. This is particularly useful when tailoring the coating process to the speed of a building product forming process, eg between about 40 to 45 seconds on a Hatschek production line.

Step 3 Curing

After forming, the green laminate article comprising the building product plus coating is preferably precured for a short time, eg up to about 48 hours, then cured by air/moist curing at room temperature, steam curing between about 40 and 90° C. or autoclaving in a steam pressure vessel between about, 120 and 200° C.

For either of these three curing techniques, a curing time range between about 6 and 72 hours, preferably up to about 48 hours, is suitable. Of course, as will be clear to persons skilled in the art, the length of time chosen for curing is dependent on the formulation, the manufacturing process and form of the article.

The following examples relate to specific formulation compositions.

Example 1

Sandable Dewatered Slurry Composition

Function: Sandable, Durable Finishing Layer for Facade Applications.

The low viscosity slurry (drainage time in 50 ml volume funnel=3.4 seconds) was applied on the base layer (Hardiform™ 12 mm thick cellulose fibre reinforced cement-based green sheet manufactured by James Hardie Industries). The slurry dewatered in 90 seconds (un-aided by vacuum) forming a 1.25 mm thick coating. The coated sheet was autoclave-cured for 8 hrs at 180° C. temperature and 0.80 MPa pressure. It was then sanded flat to 0.60 mm thick using industrial sanders equipped with 100 grit sand paper belts.

| Slurry Composition | % by total weight of solids (S) | Weight in gm |
|---|---|---|
| Dewatered Cementitious Composition | | |
| Portland Cement | 30 | 12000 |
| Silica Flour (400 G grade) | 10 | 4000 |
| Fly ash (larger size fraction) | 40 | 16000 |
| Fly ash (smaller size fraction) | 20 | 8000 |
| Total | 100 | 40000 |
| Water (W) | | 14000 |
| Water/Solids (W/S ratio) | 0.35 | |
| Solids Content (W/W + S) | 0.74 | |
| Organic Additives | | |
| Welan Gum (Kelcocrete) | 0.0075 | 3.0 |
| naphthalene formaldehyde Plasticising Agent (Neosyn) | 0.25 | 100.0 |
| Acrylic Emulsion Rhoplex MC1934 | 1.0 | 400.0 |

Example 2

Rubberised Dewatered Slurry Composition

Function: In skid-resistant flooring, hard wearing static dissipative flooring and acoustic insulating ceiling panels.

The low viscosity slurry (drainage time in 50 ml volume funnel=4.2 seconds) was applied on the base layer (Hardiform™ 12 mm thick cellulose fibre reinforced cement-based green sheet manufactured by James Hardie Industries). The slurry dewatered in 60 seconds (un-aided by vacuum) forming a 1.25 mm thick coating. The coated sheet was autoclave-cured for 8 hrs at 180° C. temperature and 0.80 MPa pressure. It was then sanded flat to 0.60 mm thick using industrial sanders equipped with 100 grit sand paper belts.

| Slurry Composition | % by total weight of solids (S) | Weight in gm |
|---|---|---|
| Dewatered Cementitious Composition | | |
| Portland Cement | 30 | 12000 |
| Recycled Rubber crumbs (minus 30 mesh) | 10 | 4000 |
| Fly ash (larger size fraction) | 40 | 16000 |
| Fly ash (smaller size fraction) | 20 | 8000 |
| Total | 100 | 40000 |
| Water | | 13000 |
| Water/Solids (W/S ratio) | 0.325 | |
| Solids Content (W/W + S) | 0.755 | |
| Organic Additives | | |
| Welan Gum (Kelcocrete) | 0.0075 | 3.0 |
| naphthalene formaldehyde Plasticising Agent (Neosyn) | 0.25 | 100.0 |
| Acrylic Emulsion Rhoplex MC1934 | 1.0 | 400.0 |

Example 3

Flexible & Sandable Dewatered Slurry Composition

Function: Flexible & Sandable Layer on Thin Fibre Cement Reinforced Cement-Based Lining.

The low viscosity slurry (drainage time in 50 ml volume funnel=2.8 seconds) was applied on the base layer (Hardiflex™ 4.5 mm thick cellulose fibre reinforced cement-based green sheet manufactured by James Hardie Industries). The slurry dewatered in 120 seconds (un-aided by vacuum) forming a 1.25 mm thick coating. The coated sheet was precured for 48 hours then was autoclave-cured for 8 hrs at 180° C. temperature and 0.80 MPa pressure. It was then sanded flat to 0.60 mm thick using industrial sanders equipped with 100 grit sand paper belts.

| Slurry Composition | % by total weight of solids (S) | Weight in gm |
|---|---|---|
| Dewatered Cementitious Composition | | |
| Portland Cement | 20 | 8000 |
| Calcium Carbonate Grade 10 (40 um avg. size) | 10 | 4000 |
| Alumina Tri-hydrate (80 um avg. size) | 5 | 2000 |
| Fly ash (larger size fraction) | 45 | 18000 |
| Fly ash (smaller size fraction) | 20 | 8000 |
| Total | 100 | 40000 |
| Water | | 12000 |
| Water/Solids (W/S ratio) | 0.30 | |
| Solids Content (W/W + S) | 0.77 | |
| Organic Additive | | |
| Welan Gum (Kelcocrete) | 0.0075 | 3.0 |
| naphthalene formaldehyde Plasticising Agent (Neosyn) | 0.25 | 100.0 |
| Styrene Acrylic Latex Emulsion (56% solids) | 5 | 2000 |

Example 4

Flexible & Sandable Dewatered Slurry Composition (Low Cement)

Function: Flexible & Sandable Layer on Thin Fibre Cement Reinforced Cement-Based Lining.

The low viscosity slurry (drainage time in 50 ml volume funnel=4.5 seconds) was applied on the base layer (Hardiflex™ 4.5 mm thick cellulose fibre reinforced cement-based green sheet manufactured by James Hardie Industries). The slurry dewatered in 90 seconds (un-aided by vacuum) forming a 1.25 mm thick coating. The coated sheet was autoclave-cured for 8 hrs at 180° C. temperature and 0.80 MPa pressure. It was then sanded flat to 0.60 mm thick using industrial sanders equipped with 100 grit sand paper belts.

| Slurry Composition | % by total weight of solids (S) | Weight in gm |
|---|---|---|
| Dewatered Cementitious Composition | | |
| Portland Cement | 10 | 4000 |
| Calcium Carbonate Grade 10 (40 um avg. size) | 20 | 8000 |
| Alumina Tri-hydrate (80 um avg. size) | 5 | 2000 |
| Fly ash (larger size fraction) | 40 | 18000 |
| Fly ash (smaller size fraction) | 25 | 10000 |
| Total | 100 | 40000 |
| Water | | 16000 |
| Water/Solids (W/S ratio) | 0.40 | |
| Solids Content (W/W + S) | 0.715 | |
| Organic Additives | | |
| Welan Gum (Kelcocrete) | 0.0075 | 3.0 |
| naphthalene formaldehyde Plasticising Agent (Neosyn) | 0.25 | 100.0 |
| Vinyl acetate-ethylene powdered copolymer (Vinnapas LL5004) | 1.625 | 650 |

The aforementioned examples provide a composite comparable in workability to monolithic or single layer composites. They can be flexed, cut, drilled or fixed by nails or the like to a frame without surface cracking or chipping.

The surface is 'finish-ready' and remains smooth, flat, crack-free and with low permeability even when used in a curved configuration.

Each example provided excellent interlaminer bond between the base sheet and coating exhibiting good composite action, compatibility and resistance to delamination.

The applicants have developed a unique process which allows them to combine fibre reinforced layers with functional dewatered slurry layers optional reinforced with a wide range of synthetic or natural fibres, eg polypropylene, glass, PVA, cellulose fibres etc. The outcome of the aforementioned method is to produce a fibre reinforced composite with strength, water resistance, incombustibility of fibre cement with a low density, surface finish and insulation properties of, for example, gypsum board.

The applicants have found that using the techniques described herein, functional layers can be added to the substrate layer with no delamination or incompatibility between the layers, ie no differential shrinking, warping or similar properties.

It will be understood by persons skilled in the art that the present invention may be embodied in other forms without departing form the spirit or scope of the inventive idea as described herein. In particular, it will be appreciated that the formulations, coatings, additives, methods and composite products of the present invention are suitable or may be adapted for use in conjunction with the methods and apparatus as described in the various priority documents.

What is claimed is:

1. A composite product comprising: a plurality of overlaying substrate layers, each bonded to at least one of the plurality of overlaying substrate layers, wherein the substrate layers are cementitious; and one or more functional layers positioned between two or more of the plurality of overlaying substrate layers wherein the one or more functional layers each in the form of a self-leveling cementitious slurry include at least one inorganic compound and the one or more functional layers are formulated with compositions that are different from the overlaying substrate layers, said functional layers are configured to improve at least one functional property of the plurality of the overlaying substrate layers.

2. The composite product of claim 1, wherein the plurality of substrate layers comprise a mixture of a hydraulic binder, cellulose fibers, and water.

3. The composite product of claim 1, wherein the inorganic compound comprises a hydraulic binder.

4. The composite product of claim 1, wherein the functional layer further comprises a plasticizing agent incorporated into the functional layer.

5. The composite product of claim 4, wherein the plasticizing agent comprises one or more of melamine sulphonate formaldehyde condensates, naphthalene sulphonate formaldehyde condensates, naphthalene sulphonates, calcium lignosulphonates, saccharose, sodium gluconate, sulphonic acids, carbohydrates, amino carboxylic acids, polyhydroxycarboxylic acids, melamine formaldehyde sodium bisulphate polymer, condensed sodium salt of sulphonated naphthalene formaldehyde and sulphonated melamine.

6. The composite product of claim 4, wherein the plasticizing agent is between about 0.3 to 3 wt % based on total of dry ingredients.

7. The composite product of claim 1, wherein the functional layer further comprises a filler incorporated into the functional layer.

8. The composite product of claim 7, wherein the filler comprises one or more of fly ash, hollow microspheres, sand, diatomite, wollastonite, ground rice hulls, ground perlite, silica flour, rubber particles, vermiculite, shredded or expanded polystyrene, gypsum, calcium carbonate and alumina hydrate.

9. The composite product of claim 7, wherein the filler is between about 5 to 30 wt % based on total of dry ingredients.

10. The composite product of claim 1, wherein the functional layer further comprises latex incorporated into the functional layer.

11. The composite product of claim 1, wherein the functional layer further comprises vinyl polymer incorporated into the functional layer.

12. The composite product of claim 1, wherein the functional layer is a reinforcing layer.

13. The composite product of claim 1, wherein the functional layer includes a fiber mesh or netting.

14. The composite product of claim 1, wherein the functional layer is an insulating layer.

15. The composite product of claim 1, wherein the functional layer is a substantially water impermeable layer.

16. The composite product of claim 1, wherein the functional layer includes an adhesive.

17. The composite product of claim 1, wherein the functional layer provides added tensile strength to the composite product.

18. A method for improving bond strength of a laminated product comprising: providing a first cementitious substrate layer; disposing at least a second cementitious substrate layer onto and overlaying the first substrate layer; and providing a functional layer between two or more of the substrate layers prior to the layers being cured, wherein the functional layer is a self-leveling cementitious slurry adapted to form a uniform coating on the respective substrate layers after dewatering through the cementitious substrate layer, said functional layer includes at least one inorganic compound and improves bond strength between two or more of the substrate layers better than without the functional layer.

19. The method of claim 18, further comprising curing the layers in an autoclave.

20. The method of claim 18, wherein at least one of the first or second substrate layers comprise a mixture of hydraulic binder, cellulose fibers and water.

* * * * *